United States Patent [19]

Armstrong

[11] 4,193,684

[45] Mar. 18, 1980

[54] PHOTOGRAPHIC PRINTING AND PRINT IDENTIFYING APPARATUS

[76] Inventor: Alvin H. Armstrong, 438 W. Pasadena Ave., Clewiston, Fla. 33440

[21] Appl. No.: 905,553

[22] Filed: May 12, 1978

[51] Int. Cl.² .................. G03B 27/52; G03B 17/24
[52] U.S. Cl. .................................. 355/40; 354/105
[58] Field of Search ........... 355/18, 39, 40, 112–115; 354/105–109

[56] References Cited

U.S. PATENT DOCUMENTS

| | | | |
|---|---|---|---|
| 1,238,504 | 8/1917 | Gaisman | 354/105 |
| 1,622,925 | 3/1927 | Ross | 354/107 |
| 1,897,908 | 2/1933 | Leavitt | 354/105 |
| 1,974,174 | 9/1934 | Chamberlain | 354/105 |
| 2,127,601 | 8/1938 | Jaffe | 355/113 X |
| 2,188,843 | 1/1940 | Pappajion | 354/105 |
| 3,356,000 | 12/1967 | Marion | 355/40 |

*Primary Examiner*—Donald A. Griffin
*Attorney, Agent, or Firm*—Clarence A. O'Brien; Harvey B. Jacobson

[57] ABSTRACT

Photographic negatives or prints marked for identification purposes by exposure of the photographic record medium to a light image at a desired location by use of a contact printer having an opaque housing within which light is produced for a timed interval and projected through spaced diffuser elements, a masking element and an exposure window of the housing to form the light image.

13 Claims, 9 Drawing Figures

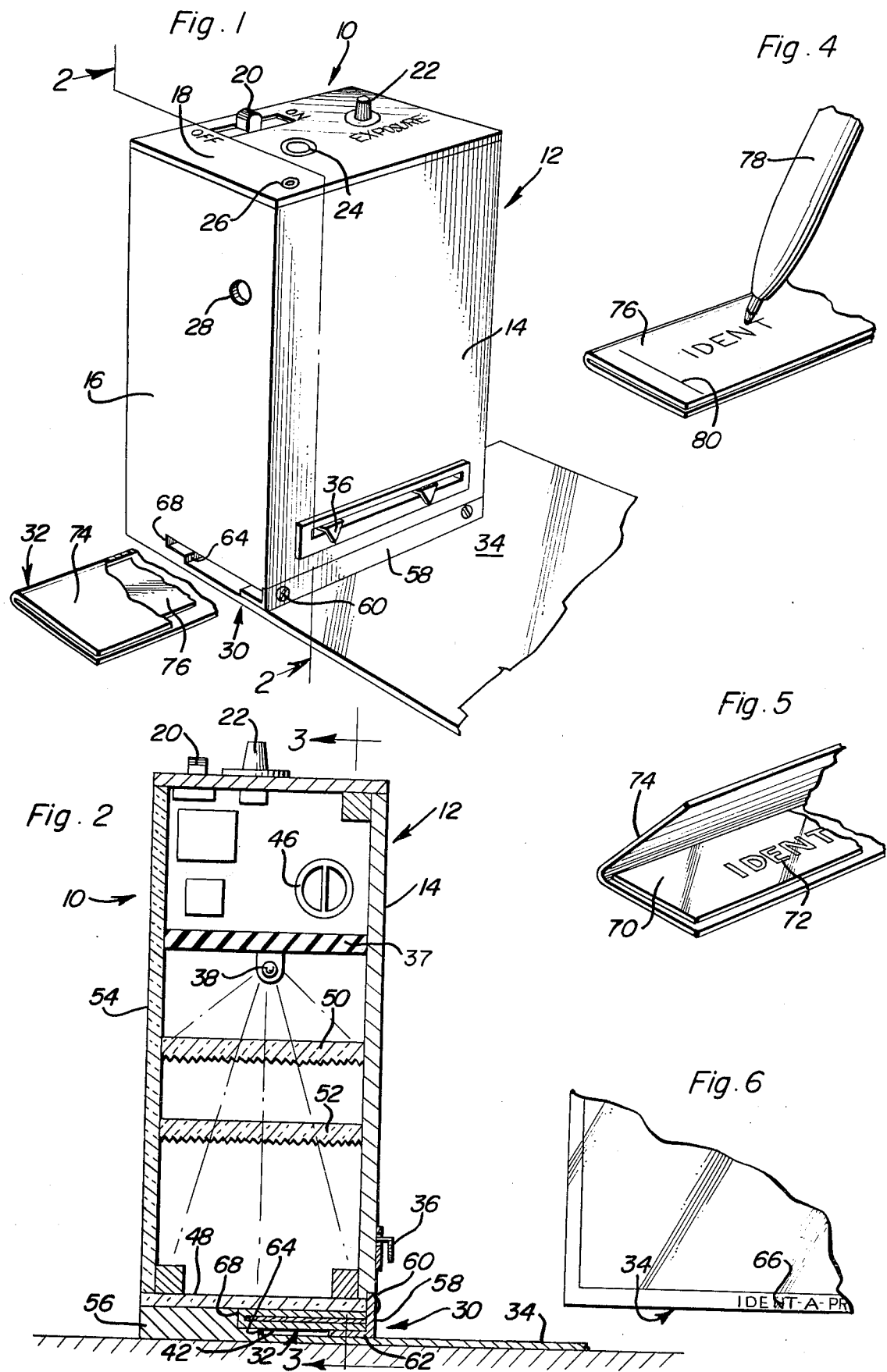

PHOTOGRAPHIC PRINTING AND PRINT IDENTIFYING APPARATUS

BACKGROUND OF THE INVENTION

This invention relates to the marking of a photographic record medium that has already been exposed.

It is often desirable to mark photographs for identification purposes. Generally, such marking is accomplished after development or printing and, therefore, requires special handling and inking material compatable with the photographic record medium. Photographic marking during the development process, on the other hand, requires special and expensive equipment as well as special handling skills. It is, therefore, an important object of the present invention to provide a relatively simple and inexpensive method and dark room accessory for photographically marking either a negative or positive record medium that has already been exposed, prior to development of the image optically recorded thereon.

SUMMARY OF THE INVENTION

In accordance with the present invention, a main housing supports a lamp that is energized under control of a timer to project light for a timed interval through a pair of diffuser elements and an exposure window to produce a light image at a desired location on a photographic record medium such as negative film or print paper. The light image is created by a light masking element inserted into a holder secured to the main housing adjacent to the exposure window. The holder is placed in abutment with the record medium to position the window and masking element relative thereto before a push button on a housing carried control panel is actuated to initiate energization of the lamp for a timed interval.

The masking element is produced by placing a clear film strip coated with a Mylar-carbon composition into a paper folder and forming identifying indicia thereon by means of a typewriter or ball pen causing corresponding portions of the coating to be transferred from the film strip to the paper. A negative image of the identifying indicia is thereby formed on the film strip which is then placed within a transparent supporting folder before being inserted into the holder as the aforementioned masking element.

An auxiliary tubular housing may be used to produce the light image in association with a plurality of masking elements peripherally mounted on a disk to which the tubular housing is pivotally connected for positioning a lower exposure end of the tubular housing over a selected one of the masking elements. The tubular housing has its own lamp and diffuser elements, the lamp being connected to the timer circuit mounted within the main apparatus housing, through a cable and plug-in jack to control exposure from the control panel of the main housing.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 1 is a perspective view showing the main apparatus of the present invention.

FIG. 2 is a side section view taken substantially through a plane indicated by section line 2—2 in FIG. 1.

FIG. 4 is a perspective view showing a step in the formation of the masking element inserted into the apparatus shown in FIGS. 1-3.

FIG. 5 is a perspective view showing the final step in preparing the masking element.

FIG. 6 is a partial elevation view of a photograph that is marked in accordance with the present invention.

DETAILED DESCRIPTION OF SPECIFIC EMBODIMENT

Figure 3:
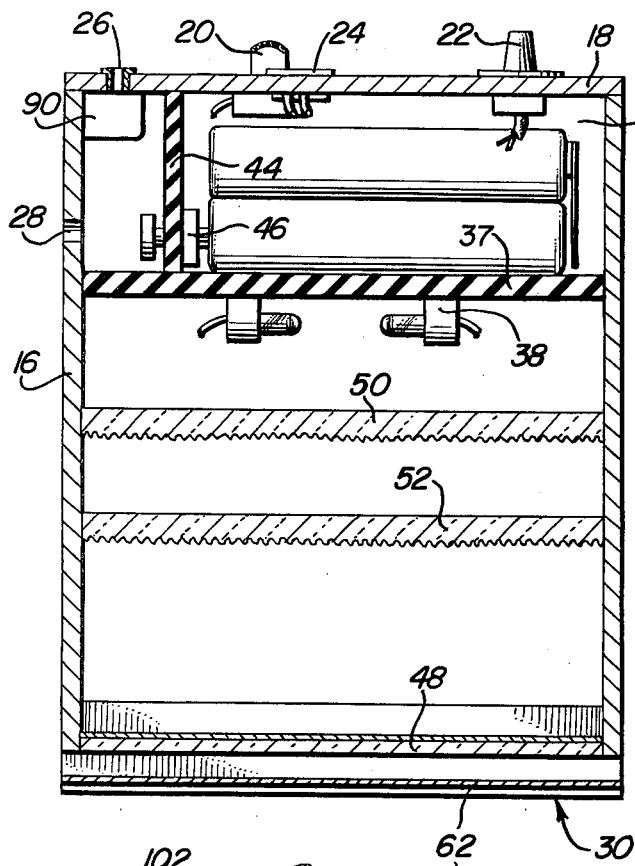
FIG. 3 is a front section view taken substantially through a plane indicated by section line 3—3 in FIG. 2.

Referring now to the drawings in detail, FIG. 1 illustrates the basic photographic marking device of the present invention, generally referred to by reference numeral 10. The device 10 in the illustrated embodiment comprises a generally rectangular, and substantially opaque housing 12 having front and side walls 14 and 16 that are completely opaque. A top wall 18 forms a control panel on which a power switch 20, an exposure, push-button switch 22 and an LED type power indicator 24 are mounted. Also, a plug-in jack receptacle 26 is mounted on the top control panel 18. One of the side walls 16 is provided with an opening 28 through which a tool may be inserted for effecting an exposure timing adjustment as will be explained hereinafter. The bottom side of the housing is provided with a holder generally referred to by reference numeral 30 into which a masking element 32 is inserted at the bottom to produce an image on the underlying photographic record medium 34. Slidably adjustable alignment guide elements 36 are mounted on the front wall 14 of the housing adjacent the bottom as shown to enable the user to position the device 10 in alignment with a desired location on the record medium 34.

Referring now to FIGS. 2 and 3 in particular, the housing 12 is internally partitioned by a circuit board 37 supporting control circuitry on the upper surface thereof connected to a pair of exposure lamps 38. The circuit board divides the housing into a chamber on the upper side thereof housing batteries 40 and a lower chamber from which light emitted from the lamps 38 is transmitted downwardly from the bottom of the housing through the masking element 32 to project a light image through an exposure window 42 onto the record medium 34 as more clearly seen in FIG. 2. The battery chamber is spaced from the adjustment hole 28 by a mounting panel 44 on which an adjustment potentiometer 46 is mounted in alignment with the hole 28. The lower chamber is closed adjacent the bottom of the housing by a planar panel 48 made of white frosted glass. A translucent opal diffuser element 50 is mounted below the lamps 38 and spaced above a second, transparent diffuser element 52. The masking element 32 is retained within an exposure slot formed by the holder 30 between the panel 48 and the exposure window 42. When energized, the lamps 38 render the housing 12 visible in a dark room by light emitted through a red translucent back wall 54 of the housing.

The holder 30 is formed by an opaque member 56 secured to the side and back walls of the housing and a flange element 58 secured by fasteners 60 to the front wall 14. A horizontal contact surface portion 62 of the flange element is vertically spaced by a small amount above the bottom surface of the member 56 and spaced horizontally from an abutment edge 64 of the member 56 to define the exposure window 42. Thus, the record medium abuts the edge 64 as shown in FIG. 2 to align the exposure window adjacent one edge of the record medium in order to photographically mark the record medium with identifying indicia 66 as shown in FIG. 6. The member 56 is also provided with a recess 68 along the edge 64 to define the exposure slot below the glass panel 48 coplanar with the gap between the panel 48 and the contact surface portion 62 of the flange element.

The marking element 32 inserted into the exposure slot includes a thin, flexible film strip 70 coated with a light blocking material such as a Mylar-carbon composition. A portion of the coating is removed at 72 as shown in FIG. 5 to create a negative image of the indicia 66. The film strip 70 is enclosed within a clear acetate folder or sleeve 74 for support thereof before being inserted into the holder 30 as the masking element. To prepare the masking element, a fully coated film strip 70 is enclosed in a paper folder or sleeve 76 as shown in FIG. 4 and the marking indicia is applied to the paper by a typewriter, a ball point pen 78 or stylus between pre-printed alignment marks 80 on the paper. The localized pressure of the ball point causes the coating material on the film to be transferred to the paper of the folder 76 leaving the transparent, light transmitting portions 72 on the film strip. The film strip is then placed in the transparent supporting folder 74 as shown in FIG. 5.

Figure 9:
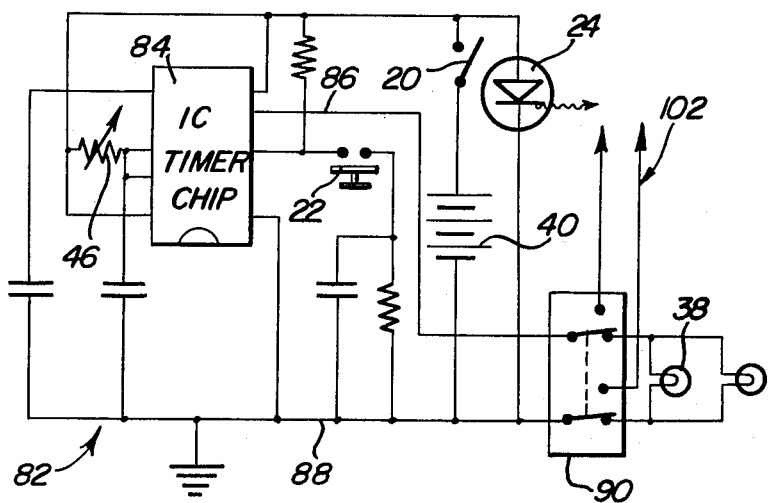
FIG. 9 is an electrical circuit diagram showing the control system associated with the present invention.

A light image is projected through the masking element by energization of the lamps 38 for a timed interval under control of circuit 82 shown in FIG. 9, the components of which are mounted on the circuit board 36 as aforementioned. The circuit 82 includes an integrated circuit timer chip 84, the timing cycle of which is preset by potentiometer 46. Upon closing of the power switch 20, the batteries 40 are connected to the power terminals of the timer chip and current is conducted through the LED indicator 24 signifying that the timer circuit is enabled. When the push-button switch 22 is then actuated to its closed position, a timing cycle is initiated during which energizing voltage is applied through output line 86 and ground line 88 across the exposure lamps 38 through a switch assembly 90 associated with the jack receptacle 26. In the normal position of the switch assembly 90, the lamps 38 are connected to the power lines 86 and 88 to provide a constant exposure time.

Figure 8:
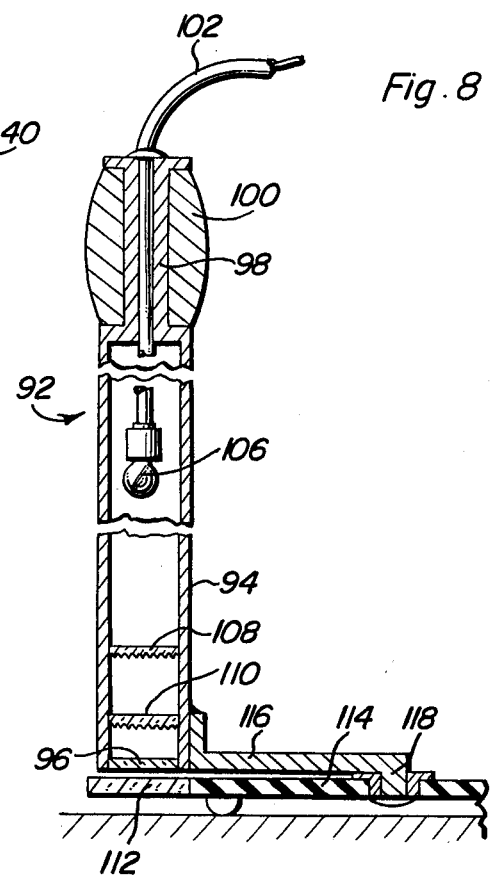
FIG. 8 is an enlarged partial section view taken substantially through a plane indicated by section line 8—8 in FIG. 7.
Figure 7:
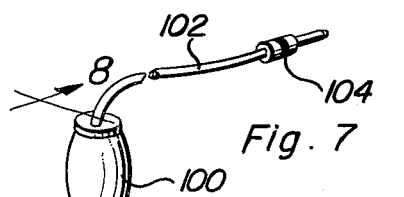
FIG. 7 is a perspective view showing an auxiliary marking device constructed in accordance with the present invention.

FIGS. 7 and 8 illustrate an auxiliary marking device 92 which may be used as an alternative for rapid and special marking purposes under control of the circuit 82 and associated controls on the top control panel 18 of the main device 10. The device 92 includes an elongated tubular housing 94 that is opaque and has an open axial end forming an exposure window closed by a light transmitting cover 96. An upper closed axial end portion 98 of the tubular housing mounts a handle grip 100 from which a power cable 102 extends to a jack prong assembly 104. The conductors in the cable 102 are connected to the power lines 86 and 88 of the circuit 82 through switch assembly 90 when the jack prong 104 is inserted into the receptacle 26. The lamps 38 are then disconnected from the power lines 86 and 88 which are connected to an exposure lamp 106 by cable 102 to energize the lamp 106 under control of the circuit 82. The light emitted from the lamp 106 is transmitted through spaced diffuser elements 108 and 110 and projected from the lower axial end of the tubular housing onto a record medium through a selected one of a plurality of masking elements 112. The masking elements 112 are mounted on the peripheral portion of a circular holder disk 114 to which the housing 94 is pivotally connected by a pivot arm 116 and central pivot 118. Thus, the lower exposure end of the housing may be angularly positioned over a selected one of the masking elements 112 and placed over a desired portion of a record medium to be photographically marked.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for marking a photographic medium in a dark room, including a substantially opaque enclosure having an exposure window, a light masking element, holder means connected to the enclosure in operative relation to the exposure window for positioning the light masking element in alignment with the window, and lamp means mounted within said enclosure in spaced relation to the window for projecting a light image through the masking element onto the exposed medium, said holder means including a slotted formation opening on one side of the enclosure for slidably received the masking element, said enclosure including a translucent wall located transversely of said one side.

2. The combination of claim 1 including alignment guide means mounted on the enclosure for indicating proper positioning of the enclosure on the photographic medium.

3. Apparatus for marking a photographic medium in a dark room, including a substantially opaque enclosure having an exposure window, a light masking element, holder means connected to the enclosure in operative relation to the exposure window for positioning the light masking element in alignment with the window, and lamp means mounted within said enclosure in spaced relation to the window for projecting a light image through the masking element onto the exposed medium, said enclosure comprising an elongated tubular housing having opposite axial ends, the exposure window being mounted at one of said ends, and handle means mounted on the housing adjacent the other of the axial ends.

4. The combination of claim 3 wherein said holder means includes a generally circular disk having a peripheral portion on which a plurality of said masking elements are mounted, and means pivotally connecting the tubular housing to the disk for angularly positioning the exposure window of the housing over a selected one of the masking elements on the peripheral portion of the disk.

5. Apparatus for marking a photographic medium including light masking elements, a pair of substantially opaque enclosures, each of said enclosures having an exposure window, lamp means mounted within each of the enclosures in spaced relation to the respective windows for projecting a light image through one of the masking elements onto the photographic medium, and diffuser means mounted within each enclosure between the lamp means and the exposure window thereof, timer means mounted within one of the enclosures and connected to the lamp means therein for energization during a preset period of time, the other of the enclosures having a cable extending therefrom and plug-in switch means connected to the cable for simultaneously connecting the lamp means in the other of the enclosures to the timer means while disconnecting the lamp means in said one of the enclosures from the timer means.

6. Apparatus for marking a photographic medium including a light masking element, a pair of substantially opaque enclosures, each of said enclosures having an exposure window, lamp means mounted within each of the enclosures in spaced relation to the respective windows for projecting a light image through the masking element onto the photographic medium, and diffuser means mounted between the lamp means and the exposure window, timer means mounted within one of the enclosures and connected to the lamp means therein for energization during a preset period of time, the other of the enclosures having a cable extending therefrom and plug-in switch means connected to the cable for simultaneously connecting the lamp means in the other of the enclosures to the timer means while disconnecting the lamp means in said one of the enclosures from the timer means, said other of the enclosures comprising a tubular auxiliary housing having opposite axial ends, the exposure window being mounted at one of said ends, and handle means mounted on the tubular housing adjacent the other of the axial ends.

7. The combination of claim 6 wherein said one of the enclosures comprises a main housing having one side provided with a slotted formation slidably receiving the light masking element and a translucent wall located transversely of said one side.

8. The combination of claim 6 including a generally circular disk having a peripheral portion on which a plurality of said masking elements are mounted, and means pivotally connecting the tubular housing to the disk for angularly positioning the exposure window over a selected one of the masking elements on the peripheral portion of the disk.

9. Apparatus for marking a photographic medium, including a substantially opaque enclosure having an exposure window, a light masking element, holder means connected to the enclosure in operative relation to the exposure window for positioning the light masking element in alignment with the window, lamp means mounted within said enclosure in spaced relation to the window for projecting a light image through the masking element onto the exposed medium, timer means connected to the lamp means for energization thereof for a preset period of time, and diffuser means mounted within the enclosure between the lamp means and the window, said holder means including an opaque member secured to the enclosure having an abutment edge against which the photographic medium is adapted to be positioned, a flanged element secured to the enclosure having a contact surface portion spaced from the abutment edge to define therewith said exposure window, a light transmitting panel secured to the enclosure in spaced relation to said contact surface portion to form a gap, said opaque member being formed with a recess coplanar with said gap to define a guide slot receiving the masking element in overlying relation to the exposure window.

10. The combination of claim 9 wherein said light masking element comprises a flexible film coated with a light blocking material, portions of which are removed to form a negative image, and a transparent sleeve within which the film is supported.

11. The combination of claim 10 wherein said enclosure includes one side on which the holder means is mounted, said holder means including a slotted formation slidably receiving the light masking element.

12. The combination of claim 9 including alignment guide means mounted on the enclosure adjacent to said exposure window for indicating proper positioning of the enclosure on the photographic medium.

13. Apparatus for marking photographic medium, including an enclosure having an exposure window, a light masking element, an opaque member secured to the enclosure having an abutment edge against which the photographic medium is adapted to be positioned, a flanged element secured to the enclosure having a contact surface portion spaced from the abutment edge to define therewith said exposure window, said opaque member being formed with a recess to form a guide slot receiving the masking element in overlying relation to the exposure window.

* * * * *